Figure 7:
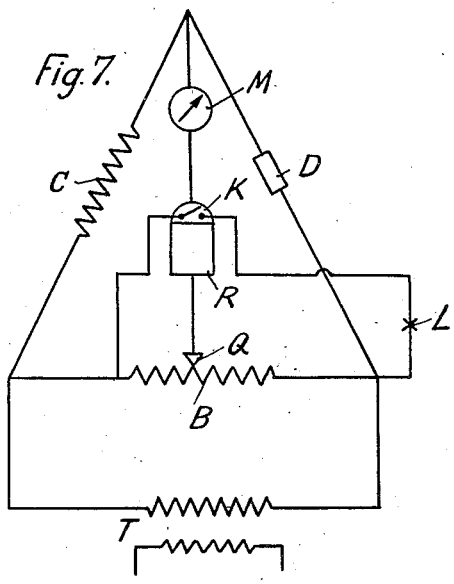

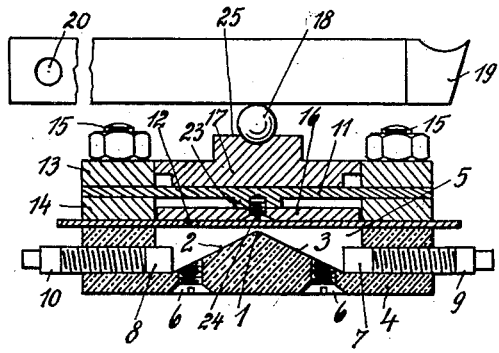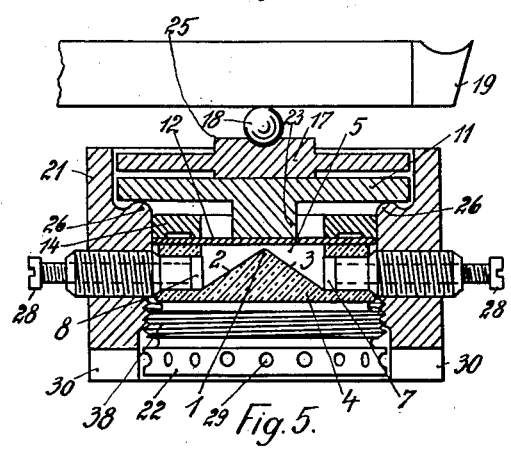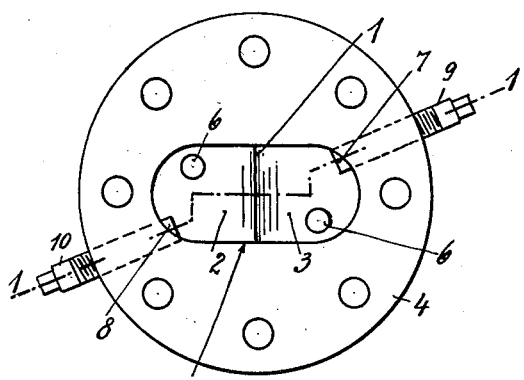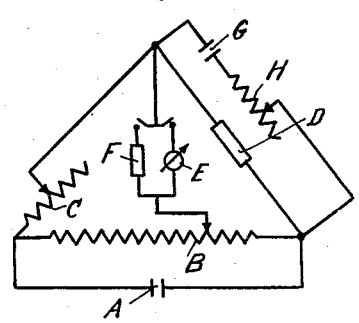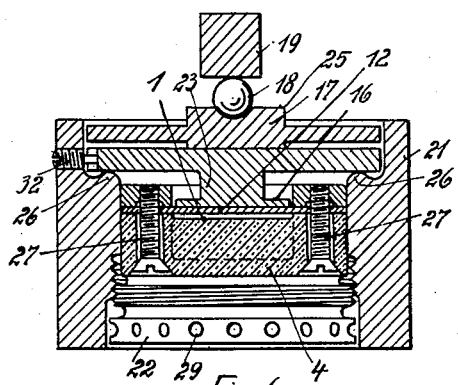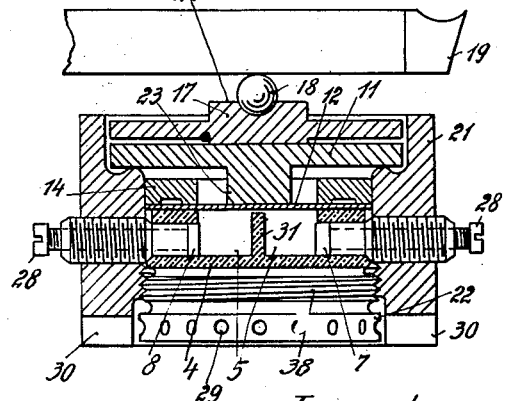

Inventors:
Adolf Wallichs
and Herwart Opitz

Patented Sept. 4, 1934

1,972,578

UNITED STATES PATENT OFFICE 1,972,578

MEASURING INSTRUMENT

Adolf Wallichs and Herwart Opitz, Aachen, Germany

Application June 28, 1932, Serial No. 619,632
In Germany August 14, 1931

7 Claims. (Cl. 201—57)

Our invention relates to a measuring instrument and more particularly to an instrument in which forces are transmitted to a diaphragm and measured by displacing an electrically conductive liquid through the medium of the diaphragm and ascertaining the resistance of the liquid which varies with its displacement, as a measure of the forces.

It is an object of our invention to improve an instrument of this type. Heretofore the entire body of conductive liquid was displaced under the influence of the forces to be measured. According to our invention we provide means for displacing the liquid only locally. In this manner we substantially eliminate the influence of inertia, as only a small portion of the liquid is displaced, the inertia of which is practically nil.

In a preferred embodiment of our invention we provide a reservoir for the reception of the conductive liquid, and means for effecting a flow of electrical energy through the liquid. The reservoir is a self-contained member which is open at one side only and preferably formed of insulating material, or insulated from the metal parts of the instrument. On this reservoir we arrange a metal diaphragm of resilient material insulated from the conductive liquid, preferably by means of a rubber diaphragm inserted between the conductive liquid and the metal diaphragm, the rubber diaphragm at the same time serving as a packing and closure for the reservoir.

In combination with the principal or steel diaphragm we provide means for transmitting to it the forces to be measured, and means for locally displacing the conductive liquid in conformity with the movements of the diaphragm, these means consisting of a ridge, rib or other projection extending toward the diaphragm from the bottom of the reservoir, the gap existing between the diaphragm and the top of the ridge or the like, when filled with the conductive liquid, delimiting the area of local displacement of the liquid or, as it may be termed, the effective free sectional area. The ohmic resistance offered by the conductive liquid to the flow of electrical energy from one electrode to the other is a function of the effective free sectional area which in turn is varied in conformity with the forces acting on the diaphragm and bending same in the direction towards the top of the ridge.

The pressure resulting from the forces to be measured is not transmitted through the conductive liquid, but the conductive liquid is only displaced locally to a greater or lesser extent from the effective free sectional area. In this manner the movement required for measuring the forces becomes a minimum, being of the order of a few hundredths of a millimeter, and the extent to which the effective free sectional area is varied, may be limited as desired. Obviously the overall height of our instrument is very small so that it may be arranged even where space is extremely limited.

The movements of the diaphragm may be recorded at any point remote from the instrument and, as the resistance of the conductors or the like which connect the instrument to the recording and/or indicating means, is known, there will be no errors.

It will be understood from this brief description that this instrument and its operation, as compared with existing instruments and methods, are extremely simple. The initial cost is low and the operation easy. Its small size permits its application to comparatively inaccessible members, such as turret heads, the tools of automatic lathes and the like. The diaphragm being made of steel, the movements required for the measuring of the forces are a minimum and hysteresis phenomena are eliminated.

Obviously we are not limited to the application of our instrument to machine tools, but we may as well measure axle loads in vehicles, pressures in closed reservoirs, axle pressures in rolling mills of every kind etc.

It is another object of our invention to provide means for relieving the reservoir of the forces to be measured. To this end we provide a casing for the reception of the reservoir and support the diaphragm on the casing.

It is still another object of our invention to provide means for varying the measuring range of the instrument. To this end we provide means such as a threaded connection for varying the position of the reservoir with respect to the diaphragm which is supported by the casing.

In the drawings affixed to this specification and forming part thereof various types of instruments embodying our invention are illustrated diagrammatically by way of example.

In the drawings

Fig. 1 is a vertical axial section of an instrument in which the diaphragm is supported on a reservoir of insulating material, Fig. 2 being a plan view of the reservoir, with the diaphragm and the holding and transmitting means connected thereto removed, Fig. 3 is a diagram of connections for an instrument operated with direct current, Fig. 4 is an axial section of an instrument in which the diaphragm is supported on a casing for the reception of the reservoir, Fig. 5 is an axial section of the same instrument, taken at right angles to the section in Fig. 4, and Fig. 6 is a section of an instrument which is substantially similar to that illustrated in Figs. 4 and 5, but has modified means for varying the effective free sectional area.

Figure 8:
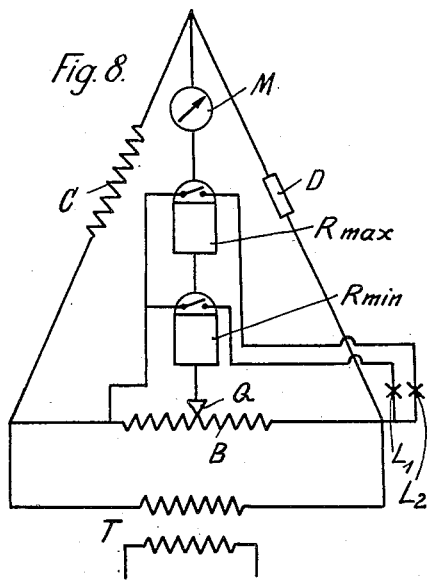
Figure 9:
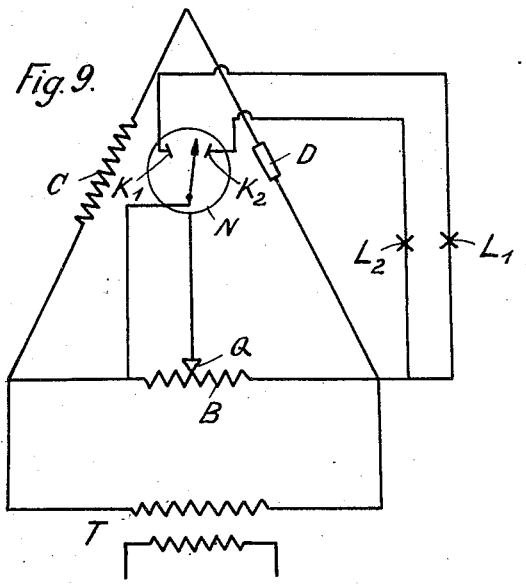

Figs. 7-9 are wiring diagrams illustrating the connection of the instrument with indicating means.

Referring to the drawings and first to Figs. 1 and 2, 19 is the member on which act the forces to be measured. This member is here shown as a lathe tool which is pivoted at 20 at the end opposite its cutting edge. 18 is a member, here shown as a ball, which transmits forces from the tool 19 to the instrument. 4 is the reservoir which, in the example illustrated, is made of insulating material.

The reservoir is formed with a central recess 5 of rectangular form with its ends curved to semi-circles. 2 and 3 are slopes ascending from the bottom of the reservoir toward the axis of the instrument and at their line of intersection forming a central ridge 1.

6 are threaded plugs in the bottom of the reservoir for filling it with the conductive liquid. 7 and 8 are electrodes at or near opposite ends of the recess 5. 9 and 10 are terminals extending to the outside of the reservoir from the respective electrodes and connecting the electrodes to a source of electric energy (not shown) so as to establish a flow of current through the conductive liquid. 12 is a rubber diaphragm resting on the top edge of the reservoir 4. The rubber diaphragm 12 should be as thin as practicable and held under uniform tension to prevent creasing. It is held down on the edge of the reservoir by means of a washer 14. 11 is the steel diaphragm which is placed on top of the washer 14, 13 is a washer which is placed on top of the diaphragm 11, and 15 are bolts for holding the rubber diaphragm 12, the steel diaphragm 11 and the washers 13 and 14 together. 16 is a pressure-distributing plate which is secured to a downwardly extending central projection 23 of the steel diaphragm by a screw 24 and bears on the rubber diaphragm 12. The plate 16 fits the interior of the reservoir 4 with some clearance.

17 is a pressure-transmitting member which is inserted in the upper washer 13 with some clearance or at a sliding fit, and bears on the steel diaphragm with its shouldered lower face while its upper face is equipped with a boss 25 for the reception of the ball 18. We may provide a set of exchangeable transmitting members 17, each member having its individually formed face bearing on the steel diaphragm 11 so that by exchanging one transmitting member for a member of smaller or larger area the bulging of the diaphragm 11 under a given force may be varied.

In operation the vertical components of the forces resulting from the cutting of metal by the edge of the tool 19, or from variable axle loads or the like, as mentioned above, are transmitted to the steel diaphragm 11 through the transmitting member 17. The steel diaphragm 11 is bulged to a greater or lesser extent in conformity with the component acting on it, and the cross-sectional area of the liquid layer between the top edge of the ridge 1 and the rubber diaphragm 12 is reduced, the resistance offered to the passage of the current being increased in proportion. This variation of resistance is proportional to the bulging of the diaphragm and consequently to the force to be measured. In order to prevent the exertion of pressure on the liquid in the recess 5, we may connect to the recess a rising pipe (not shown) which is open at the top so that the liquid in the reservoir 4 is under atmospheric pressure, and, if displaced, is free to rise in the pipe. On the other hand, the conductive liquid may be filled into the reservoir 4 under pressure, preferably through one or both of the electrodes 8 and 9 and their terminal connections, as will be described with reference to Figs. 4 to 6. It is not necessary to provide for the removal of air or other bubbles in the conductive liquid, as they tend to collect at the highest point of the reservoir and are therefore displaced from the effective free sectional area when the diaphragm is bulged.

Obviously, when the diaphragm is relieved of the pressure acting thereon and returns to its initial position, the displaced liquid will return to the effective sectional area and therefore, theoretically, the function of the instrument is not free of inertia forces. On account of the local character of the displacement, however, inertia forces will attain an appreciable amount only at very high frequencies and it has been found that no inertia forces were observed at a frequency up to 200 periods per second.

If the energy flowing in the conductive liquid is alternating current, it is not necessary to provide means for preventing electrolysis or electro-chemical separation in the liquid conductor. The resistance at the effective free sectional area may be measured by an oscillograph, provided that the variations of the forces may be indicated in periods corresponding to the periodicity of the oscillograph. If high current is employed, normal voltmeters may be used for indicating and/or recording the measured forces so that the instrument becomes more economic.

The connections of the system to supply the instrument with current may be designed like a Wheatstone bridge, as shown in Fig. 3. The connection illustrated in Fig. 3 is designed for direct current. A is a storage cell which is connected at both ends to a variable resistance B and C is a variable resistance connected to the storage cell A and to the instrument D. Intermediate the contacts of the resistances B and C a milli-voltmeter E or an oscillograph loop F may be provided as indicating and/or recording means. G is a source of current which is connected to a variable resistance H. The resistance is connected to one electrode of the instrument D, the source of electricity G being connected to the other electrode. The direction of the current from G is opposed to the direction of the current from A. By these means the electrolysis or electro-chemical separation in the conductor is prevented or reduced to such an extent, that it will not interfere with the accuracy of the measurements for several hours.

Referring now to Figs. 4 to 6, the reservoir 4 with the steel diaphragm 11 and the rubber diaphragm 12 is arranged substantially as described before, but is here surrounded by a steel casing 21 with a shoulder or bearing 26 near its top end acting as a support for the edge of the diaphragm 11. The distributing plate 16 is here formed integral with the central projection 23 of the steel diaphragm, but might also be connected thereto by the screw 24 (Fig. 1). The washer 14 secures the rubber diaphragm 12 on the edge of the reservoir 4 and screws 27 are provided for holding the washer 14 which are inserted from the bottom end of the reservoir 4.

The electrodes and their terminal connections are bored axially and closed by plugs 28. If it is desired to charge the reservoir with liquid the plugs 28 are removed and the electrodes, or one of them, are connected to a pump or the like.

The casing 21 supporting the diaphragm 11 on its shoulder 26, enables greater forces to be measured than by the instrument illustrated in Figs. 1 and 2, the forces being here transmitted to the shoulder 26 by the steel diaphragm 11 without stressing the reservoir, which being made of insulating material will not stand high pressure. The reservoir 4 being inserted in the casing 21 as self-contained unit, the distance between the diaphragm 11 and the reservoir 4 may be varied, allowing to vary the measuring range within limits as wide as 10–100 and 100–1000 kilograms.

Suitable means may be provided for adjusting the reservoir 4 in the casing 21. In the example illustrated the reservoir 4 has a threaded portion 38 which engages in a corresponding female thread of the casing 21, and is equipped with a handle 22 for rotating the reservoir 4 to vary the distance of its ridge 1 from the rubber diaphragm 12. In the example illustrated the handle 22 has holes 29 for the insertion of a tool (not shown) through recesses 30 in the base of the casing 1.

The forces are transmitted from the tool 19 to the steel diaphragm 11 in the manner described and absorbed by the shoulder 26 of the casing 21. The bulging of the diaphragm 11 varies the effective free sectional area at the ridge 1 in the manner described with reference to Figs. 1 and 2, but the forces are not transmitted to the reservoir 4 itself.

By rotating the handle 22 the effective free sectional area between the ridge 1 and the rubber diaphragm 12 may be so adjusted that the bulging of the diaphragm causes a sufficient variation in the ohmic resistance of the liquid conductor in the reservoir 4.

The instrument shown in Fig. 6 is substantially similar to that illustrated in Figs. 4 and 5 with the exception that it has a central rib 31 instead of the slopes 2 and 3 and the central ridge 1.

As the pressure-distributing plate 16 is not circular in the examples illustrated in Figs. 4 to 6, means are preferably provided for holding the steel diaphragm 11 in a definite position such as a threaded pin 32 (Fig. 5) which is inserted in a threaded bore of the casing 21, with its inner end engaging in a slot in the perimeter of the steel diaphragm 11.

As shown in Fig. 7, the instrument D may be inserted in a connection comprising a relay for actuating an indicating lamp. T is a transformer supplying alternating current into the secondary circuit. B is a resistance connected to the secondary terminals of transformer T. C is another resistance connected in series to the instrument D, both being connected in shunt to resistance B and across the secondary terminals of transformer T. R is a current responsive relay, for instance a relay closing its contact K at a predetermined current value and is connected in series with an ammeter M between the intermediate point of resistance C and instrument D and the adjustable tap Q of resistance B. L is an indicating device, for instance an incandescent lamp connected in series with the relay contact A across the secondary terminals of transformer T.

The device illustrated in Fig. 7 operates in the following manner:

The current flowing through relay R depends upon the ratio between the resistance of the instrument D and the resistance C. If the tap Q is adjusted so as to subdivide resistance B into equal portions, no current will flow through relay R so long as the resistance of instrument D is equal to resistance C. If the resistance of the instrument D is changed by applying to it pressure in the manner above described, current will flow through relay R and when this current has reached a predetermined value relay R will close its contact K so that the incandescent lamp L is energized and indicates that a predetermined maximum pressure is exerted on the instrument D.

The connection shown in Fig. 8 differs from the one shown in Fig. 7 merely in that two current-responsive relays connected in series and two lamps are provided, instead of the single relay and lamp in Fig. 7. The relays are a maximum and a minimum current relay, respectively, relay $R_{max}$ being an overcurrent relay energizing an incandescent lamp $L_2$ at a predetermined overcurrent, while relay $R_{min}$ is a relay energizing the lamp $L_1$ when the current decreases below a predetermined value. Obviously both lamps are cut out only as long as the current is within the interval between the lower and upper limit corresponding to the critical current values of the relays. When the current rises above the upper limit or decreases below the lower limit, this will be indicated by energization of lamp $L_2$ or $L_1$, respectively.

In Fig. 9 the relays $R_{max}$ and $R_{min}$ and the ammeter M of Fig. 8 are replaced by a current meter N having a minimum contact $K_1$ and a maximum contact $K_2$. The operation of this device is exactly the same as of that shown in Fig. 8, the meter N by means of its pointer closing one of its contacts and energizing the associated lamp when the current decreases below the lower limit or rises above the upper limit of a predetermined current interval.

Instead of lamps $L_1$, $L_2$ controlling devices may be provided by which the pressure measured by the instrument D is influenced. For instance if the instrument D measures the pressure of a tool machine, the controlling device connected in series with the contacts of the overcurrent relay may interrupt or diminish the current of the driving motor of the tool machine. In some cases the current flowing between the intermediate point of resistance C and instrument D and the tap Q may be directly used for actuating indicating or controlling devices. Instead of optical signalling devices, such as lamps, acoustical devices, such as loudspeakers, may be used. If necessary the indicating current may be amplified by means of an amplifier.

We wish it to be understood that we do not desire to be limited to the exact details of construction shown and described for obvious modifications will occur to a person skilled in the art.

We claim:—

1. An instrument for measuring great mechanical forces comprising a reservoir, an elastic insulating cover sealing said reservoir, a body of electrically conductive liquid completely filling said reservoir in direct contact with the inner surface of said cover, an elastic peripherally supported metal plate in bodily contact with the central portion of said cover, means for applying to the central portion of said plate the forces to be measured, means for establishing a flow of electrical energy through said liquid and means arranged for cooperation with said cover to locally displace said liquid under the influence of the forces to be measured so as to vary the electrical resistance in said flow establishing means.

2. An instrument for measuring great mechanical forces comprising a reservoir, a casing surrounding said reservoir, an elastic insulating cover sealing said reservoir, a body of electrically conductive liquid completely filling said reservoir in direct contact with the inner surface of said cover, an elastic metal plate peripherally supported by said casing in bodily contact with the central portion of said cover, means for applying to the central portion of said plate the forces to be measured, means for establishing a flow of electrical energy through said liquid and means arranged for cooperation with said cover to locally displace said liquid under the influence of the forces to be measured so as to vary the electrical resistance in said flow establishing means.

3. An instrument for measuring great mechanical forces comprising a reservoir, an elastic insulating cover sealing said reservoir, a body of electrically conductive liquid completely filling said reservoir in direct contact with the inner surface of said cover, an elastic peripherally supported metal plate in bodily contact with the central portion of said cover, means for applying to the central portion of said plate the forces to be measured, means for establishing a flow of electrical energy through said liquid and means extending from the bottom of said reservoir into proximity with said cover to locally displace said liquid under the influence of the forces to be measured so as to vary the electrical resistance in said flow establishing means.

4. An instrument for measuring great mechanical forces comprising a reservoir, an elastic insulating cover sealing said reservoir, a body of electrically conductive liquid completely filling said rservoir in direct contact with the inner surface of said cover, an elastic peripherally supported metal plate in bodily contact with the central portion of said cover, means for applying to the central portion of said plate the forces to be measured, said means including a set of exchangeable members of different size adapted to engage said cover, means for establishing a flow of electrical energy through said liquid and means arranged for cooperation with said cover to locally displace said liquid under the influence of the forces to be measured so as to vary the electrical resistance in said flow establishing means.

5. An instrument for measuring great mechanical forces comprising a reservoir, an elastic insulating cover sealing said reservoir, a body of electrically conductive liquid completely filling said reservoir in direct contact with the inner surface of said cover, an elastic peripherally supported metal plate in bodily contact with the central portion of said cover, means for applying to the central portion of said plate the forces to be measured, means for establishing a flow of electrical energy through said liquid and a ridge on the bottom of said reservoir extending into proximity of and arranged for cooperation with said cover to locally displace said liquid under the influence of the forces to be measured so as to vary the electrical resistance in said flow establishing means.

6. An instrument for measuring great mechanical forces comprising a reservoir, a casing surrounding said reservoir, means for adjusting said reservoir in said casing, an elastic insulating cover sealing said reservoir, a body of electrically conductive liquid completely filling said reservoir in direct contact with the inner surface of said cover, an elastic metal plate peripherally supported by said casing in bodily contact with the central portion of said cover, means for applying to the central portion of said plate the forces to be measured, means for establishing a flow of electrical energy through said liquid and means arranged for cooperation with said cover to locally displace said liquid under the influence of the forces to be measured so as to vary the electrical resistance in said flow establishing means.

7. An instrument for measuring great mechanical forces comprising a reservoir, an elastic insulating cover sealing said reservoir, a body of electrically conductive liquid completely filling said reservoir in direct contact with the inner surface of said cover, an elastic peripherally supported metal plate in bodily contact with the central portion of said cover, means for applying to the central portion of said plate the forces to be measured, means for establishing a flow of alternating current through said liquid and means arranged for cooperation with said cover to locally displace said liquid under the influence of the forces to be measured so as to vary the electrical resistance in said flow establishing means.

ADOLF WALLICHS.
HERWART OPITZ.